Dec. 15, 1925.  
R. L. HAYS  
1,565,643  
OIL PACKING WASHER  
Filed April 30, 1925

Robert L. Hays  
INVENTOR.

BY  
ATTORNEY.

UNITED STATES PATENT OFFICE.

ROBERT LEE HAYS, OF DALLAS, TEXAS.

OIL-PACKING WASHER.

Application filed April 30, 1925. Serial No. 27,049.

*To all whom it may concern:*

Be it known that I, ROBERT LEE HAYS, a citizen of the United States, residing at Dallas, in the county of Dallas and State of Texas, have invented certain new and useful Improvements in Oil-Packing Washers, of which the following is a specification.

This invention relates to devices for internal combustion motors and it refers more particularly to an oil packing washer arranged to encircle the bearings in the transmission housing of such motors, more especially that of the Ford type.

The primary object of the invention is to provide a device to be applied to the various openings in the transmission housing of the motor whereby to prevent leakage of oil therefrom, such as the brake pedal and clutch pedal shafts and other openings.

The invention further aims to provide a simple and durable packing washer, as well economical, for the purposes above specified, which may be readily applied to the various bearings of a motor, to positively overcome leakage of oil therefrom.

Further objects and advantages, as well as the foregoing, are attained by the device illustrated in the appended drawings and described and manifested in the course of the following detailed description:

In proceeding according to the foregoing, 1 denotes a Ford type of transmission housing, having a brake bearing 2, a clutch bearing 3, a reverse bearing 4 and an emergency brake bearing 5. From the various openings in which these bearings are situated, the transmission oil has been found to exude, thus resulting in not only depletion of the oil in the crank case of the motor, but also causing the exterior mechanism to become besmeared with the lubricant and upon which dust and dirt accumulates, thereby deteriorating the mechanism and making the same difficult to repair when damaged.

Figure 1:
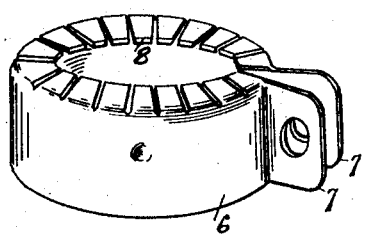
Figure 1 represents a perspective view of the invention.
Figure 2:
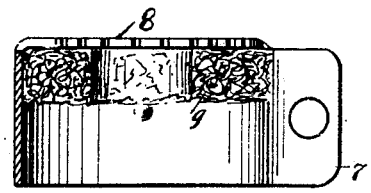
Figure 2 is a cross-sectional view thereof.

The invention, illustrated in Figures 1 and 2 consists of a cylindrical cup shaped washer 6, having its periphery longitudinally divided, whereon ears 7 are formed, which latter are apertured to receive rivets or bolts. An annular flange 8 is circumferentially formed on the body 6 and which is divided into radially spaced segments as shown, in order to permit proper shaping of the body 6.

Figure 3:
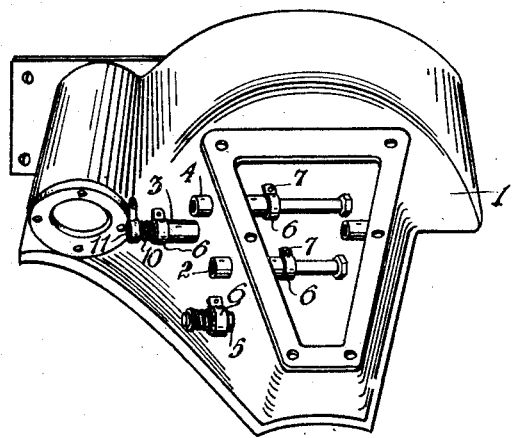
Figure 3 shows the invention applied to the bearings of a Ford transmission housing.

Within the body 6, a washer 9, composed of felt or other fibrous or absorptive material is placed against the flange 8 and is thereby retained to imbibe or absorb the liquid as the latter enters the body 6 when secured in position on the bearings as illustrated in Figure 3. It is necessary, on the brake and reverse pedal bearings 2 and 4 respectively, to mount the washer 6 interiorly of the housing 1 whereby the latter may properly perform its functions.

To prevent displacement of the washer 6, and to insure proper stability thereof, a small spring 10 is interposed between the said washer 6 and the pedal 11, which applies to the interior washers also.

It is obvious therefore that by placing the body 6 snugly over the bearings as illustrated in Figure 3, and clamping the ears 7 securely together, the oil is positively prevented from seeping through the bearing apertures.

The invention has been described as being applied preferably to the Ford type motor, but it will of course be seen that the same may also be applicable in various uses where a washer of the type set forth is required.

I claim:

A packing washer having a cylindrical split body provided with an annular flange of spaced radial segments; ears on the split portions of said body; a porous washer interiorly abutting said flange, and means to connect the said ears together.

In testimony whereof I affix my signature.

ROBERT LEE HAYS.